United States Patent [19]

Brookes

[11] Patent Number: 4,509,546

[45] Date of Patent: Apr. 9, 1985

[54] FIRESAFE SEAL

[75] Inventor: David A. Brookes, Orpington, England

[73] Assignee: The British Petroleum Company p.l.c., London, England

[21] Appl. No.: 630,065

[22] Filed: Jul. 12, 1984

[30] Foreign Application Priority Data

Jul. 15, 1983 [GB] United Kingdom ............... 8319185

[51] Int. Cl.³ .............................................. F16K 13/04
[52] U.S. Cl. ..................................... 137/74; 251/159; 251/172; 251/174; 277/26; 277/34
[58] Field of Search ................... 137/72, 74; 251/159, 251/171, 172, 174; 277/26, 34, 34.6, 226

[56] References Cited

U.S. PATENT DOCUMENTS 3,043,469  7/1962  Leach ............................ 251/172 X
3,346,234  10/1967  Allen ................................... 251/174
3,497,177  2/1970  Hulsey ................................ 251/172
3,711,062  1/1973  Kirkwood ...................... 251/171 X

*Primary Examiner*—Harold W. Weakley
*Attorney, Agent, or Firm*—Morgan, Finnegan, Pine Foley & Lee

[57] ABSTRACT

A sealing assembly comprises three non-compressible and relatively movable members, the first and second members having a first elastomeric sealing element located between them, the second and third members having a second elastomeric element located between them to urge the second member away from the third member and towards the first member. Spaces are provided between the second and third members and are occupied by an elastomeric spring biassed to urge the second member away from the first member and a metallic spring biassed to urge the second member towards the first member. The force exerted by the elastomeric spring is greater than and opposite to that exerted by the metallic spring.

The sealing assembly is fire safe and particularly suitable for use in a ball valve.

6 Claims, 1 Drawing Figure

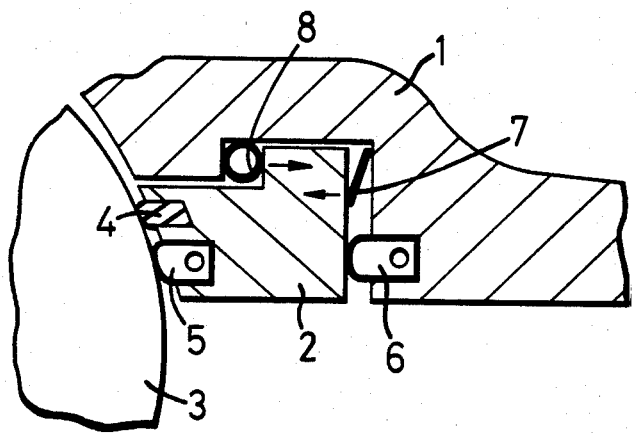

FIRESAFE SEAL

This invention relates to a sealing assembly, more particularly to a sealing assembly for ball valves suitable for installation in oil and gas pipelines, and to ball valves including the assembly.

Ball valves are known and have been previously used in oil and gas pipelines. A ball valve comprises a body within which is a steel seal housing which compresses a sealing element of compressible material into engagement with the ball to effect the sealing. The compressible material and the surface of the ball itself tend to erode in use and as a result to develop leaks. In the case of a crude oil pipeline this is possibly due to the action of associated solid particles such as sand. When a leak has developed it is frequently necessary to replace the entire valve. This operation is expensive since, in addition to the cost of the replacement ball valve, the pipeline has to be closed down and the fluid flow interrupted.

Our European patent application No. 0 063 959 discloses and claims a sealing assembly comprising two non-compressible and relatively movable members having a sealing element located between them, the sealing element being operated by the pressure of hydraulic fluid to provide a seal between the two non-compressible members, the sealing element being located in a recess in one of the non-compressible members so that when the pressure of the hydraulic fluid is released the element retracts into the recess to release the sealing engagement and facilitate the relative movement of the non-compressible members.

This sealing assembly is suitable for use in a ball valve and it reduces wear on the sealing element and also facilitates the operation of the valve.

We have now devised a sealing assembly which is firesafe yet still retains thwe above properties. By "firesafe" we mean that in the event of a fire destroying some of the components of the sealing assembly, the assembly still retains a sealing action.

Thus according to the present invention, there is provided a sealing assembly comprising three non-compressible and relatively movable members, the first and second members having a first elastomeric, inflatable sealing element located between them, the second and third members having a second elastomeric, inflatable sealing element located between them to urge the second member away from the third member and towards the first member, spaces being provided between the second and third members and being occupied by an elastomeric spring biassed to urge the second member away from the first member and a metallic spring biassed to urge the second member towards the first member, the force exerted by the elastomeric spring being greater than and opposite to that exerted by the metallic spring.

Preferably the non-compressible members are made from metal, most preferably from steel.

Preferably the first elastomeric, inflatable sealing element is located in a recess in the second member and is operated by the pressure of hydraulic fluid so that when the pressure is released, the element retracts into the recess to release the sealing engagement and facilitate the relative movement of the non-compressible members.

Preferably the second elastomeric, inflatable sealing element is located in a recess in the third member and is operated by the pressure of hydraulic fluid so that when the pressure is released, the element retracts into the recess and ceases to urge the second member against the first.

Both sealing elements can conveniently be in the form of annular pistons.

The sealing assembly of the present invention is particularly suitable for employment within a ball valve.

In the event of a fire, the elastomeric components may be destroyed and if this happens the unopposed action of the metallic spring urges the second member against the first member to provide a seal, usually a metal to metal seal.

The invention is illustrated with reference to the accompanying drawing which is a schematic sectional elevation of a sealing assembly for a ball valve.

The valve comprises a steel housing 1, a steel seal carrying member 2 and a steel ball 3.

The member 2 carries a primary seal 4 in the form of a polytetrafluoroethylene ring and an inflatable secondary seal 5 comprising a rubber annulus to which hydraulic fluid can be supplied. The secondary seal 5 is intended mainly for use when the ball valve is closed. In operation it is inflated to provide a back up for the primary seal 4 by effecting a seal against small irregularities in the surface of the ball 3.

The housing 1 carries a seal 6 similar to seal 5 comprising a rubber annulus to which hydraulic fluid can be supplied. Inflation of the seal 6 urges the seal carrier 2 against the ball 3 and increases the effectiveness of seals 4 and 5.

A metal Belville spring 7 also urges the seal carrier 2 against the ball 3 but its action is resisted by a rubber O-ring spring 8 of slightly greater strength acting in the opposite direction.

When it is desired to actuate the ball valve, seals 5 and 6 are deflated and disengage, and springs 7 and 8 largely neutralise one another. The net effect is that little or no pressure is exerted on the ball 3 and it can move freely relative to the seal carrying member 2 and the housing 1.

In the event of a fire, seals 4, 5 and 6 might be destroyed. If this happened, spring 8 would probably fail and without its restraining effect, the metal spring 7 would become effective and urge the seal carrying member 2 into metal face to face contact with the ball 1.

I claim:

1. A sealing assembly comprising three non-compressible and relatively movable members, the first and second members having a first elastomeric, inflatable sealing element located between them, the second and third members having a second elastomeric, inflatable sealing element located between them to urge the second member away from the third member and towards the first member, spaces being provided between the second and third members and being occupied by an elastomeric spring biassed to urge the second member away from the first member and a metallic spring biassed to urge the second member towards the first member, the force exerted by the elastomeric spring being greater than and opposite to that exerted by the metallic spring.

2. A sealing assembly according to claim 1 wherein the non-compressible members are metallic.

3. A sealing assembly according to claim 1 wherein the first elastomeric, inflatable sealing element is located in a recess in the second member and is operated by the pressure of hydraulic fluid so that when the pressure is released, the element retracts into the recess to release the sealing engagement and facilitate the relative movement of the non-compressible members.

4. A sealing assembly according to claim 3 wherein the second elastomeric, inflatable sealing element is located in a recess in the third member and is operated by the pressure of hydraulic fluid so that when the pressure is released, the element retracts into the recess and ceases to urge the second member against the first.

5. A sealing assembly according to claim 4 wherein the elastomeric, inflatable sealing elements are in the form of annular pistons.

6. A ball valve incorporating a sealing assembly according to claim 1.

* * * * *